US007855967B1

(12) United States Patent
Rangavajjhala et al.

(10) Patent No.: US 7,855,967 B1
(45) Date of Patent: Dec. 21, 2010

(54) METHOD AND APPARATUS FOR PROVIDING LINE RATE NETFLOW STATISTICS GATHERING

(75) Inventors: Venkata Rangavajjhala, Fremont, CA (US); Marc A. Schaub, Sunnyvale, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 120 days.

(21) Appl. No.: 12/239,041

(22) Filed: Sep. 26, 2008

(51) Int. Cl.
*H04J 1/16* (2006.01)
*H04J 3/14* (2006.01)
*G06F 13/28* (2006.01)
*G06F 15/173* (2006.01)

(52) U.S. Cl. ........................ 370/241; 370/252; 370/253; 370/255; 709/224; 709/226; 710/22

(58) Field of Classification Search ................. 370/241, 370/252, 253, 255; 709/224, 226; 710/22
See application file for complete search history.

(56) References Cited

U.S. PATENT DOCUMENTS

| 5,737,746 | A  * | 4/1998  | Hardin et al.    | 711/118 |
| 6,286,080 | B1 * | 9/2001  | Galbraith et al. | 711/113 |
| 6,650,640 | B1 * | 11/2003 | Muller et al.    | 370/392 |
| 6,871,265 | B1 * | 3/2005  | Oren et al.      | 711/128 |
| 6,904,456 | B2 * | 6/2005  | Cox              | 709/219 |
| 6,985,941 | B2   | 1/2006  | Schweitzer et al.|         |
| 7,010,611 | B1 * | 3/2006  | Wiryaman et al.  | 709/232 |
| 7,277,437 | B1 * | 10/2007 | Mammen et al.    | 370/392 |
| 7,411,957 | B2 * | 8/2008  | Stacy et al.     | 370/392 |
| 7,447,204 | B2 * | 11/2008 | Narvaez          | 370/389 |
| 7,512,980 | B2 * | 3/2009  | Copeland et al.  | 726/23  |
| 7,644,157 | B2 * | 1/2010  | Shomura et al.   | 709/224 |
| 7,729,271 | B2 * | 6/2010  | Tsuchiya et al.  | 370/252 |
| 2003/0105976 | A1 * | 6/2003  | Copeland, III    | 713/201 |
| 2005/0213504 | A1 * | 9/2005  | Enomoto et al.   | 370/235 |
| 2005/0275658 | A1 * | 12/2005 | Sasaki et al.    | 345/557 |
| 2005/0276228 | A1 * | 12/2005 | Yavatkar et al.  | 370/242 |
| 2006/0206635 | A1 * | 9/2006  | Alexander et al. | 710/22  |
| 2007/0061433 | A1 * | 3/2007  | Reynolds et al.  | 709/223 |
| 2007/0153689 | A1 * | 7/2007  | Strub et al.     | 370/230 |
| 2007/0177600 | A1 * | 8/2007  | Suzuki et al.    | 370/392 |
| 2007/0291755 | A1 * | 12/2007 | Cheng et al.     | 370/390 |
| 2008/0002586 | A1 * | 1/2008  | Sahita et al.    | 370/235 |
| 2008/0291915 | A1 * | 11/2008 | Foschiano        | 370/392 |
| 2009/0161547 | A1 * | 6/2009  | Riddle et al.    | 370/236 |

* cited by examiner

*Primary Examiner*—Chi H Pham
*Assistant Examiner*—Farah Faroul
(74) *Attorney, Agent, or Firm*—James M. Wu; JW Law Group

(57) ABSTRACT

An apparatus and method for using a direct memory access ("DMA") to facilitate netflow statistics are disclosed. A network device such as a router or a switch, in one embodiment, includes a statistic component, a local memory, and a memory access controller. The statistic component is configured to gather information relating to net usage from packet flows or netflows in response to corresponding index values or tags. While the local memory such as a cache provides the index values or tags assignable to packet flows, the memory access controller such as a DMA transfers at least a portion of the index values or tags between the local memory and a main memory for enhancing capacity of the local memory.

20 Claims, 6 Drawing Sheets

US 7,855,967 B1

METHOD AND APPARATUS FOR PROVIDING LINE RATE NETFLOW STATISTICS GATHERING

FIELD

The exemplary embodiment(s) of the present invention relates to communications network. More specifically, the exemplary embodiment(s) of the present invention relates to network usage measurement.

BACKGROUND

A high-speed network environment typically includes network devices such as routers and switches that facilitate delivery of information packets from source devices to destination devices. Information pertaining to the transfer of packet(s) through the network is usually embedded within one or more packets. Each packet traveling through a network can typically be treated independently from other packets in a packet stream. For example, each router within a network processes incoming packets and determines where the packet(s) should be forwarded. In a high-speed computing network environment, the speed of packet processing or routing can be critical in determining the performance of overall network system.

To manage and monitor net traffics in a high-speed conventional communications network, a measurement of netflow within IT (information technology) industry has been developed. Netflows are typically used to control net traffics and measure network usage by users. Each netflow or net flow includes a group of packets, which may carry data, video, audio, or a combination of data, video, and audio information. Some flows last for a long time due to continuous data transfer while other flows are transient because they exist for a very short period of time such as a ping command. As such, implementing and monitoring netflows traveling through a routing engine (or a router) is a critical network task.

A problem associated with the traditional netflow implementation is detecting and tracking a new netflow in a high speed network since system software is usually used to identify a new flow. System software typically does not operate at a line rate. A conventional approach to tracking high-speed new netflow is to employ hardware tracking and indexing mechanism. A challenge, however, with employment of hardware tracking and indexing mechanism is that the indexes in an on-chip memory is finite.

SUMMARY

An apparatus and method for using a direct memory access ("DMA") to facilitate netflow statistics are disclosed. A network device such as a router or a switch, in one embodiment, includes a statistic component, a local memory, and a memory access controller. The statistic component is configured to gather information relating to net usage from packet flows or netflows in response to corresponding index values or tags. While the local memory such as a cache provides the index values or tags assignable to packet flows, the memory access controller such as a DMA transfers at least a portion of the index values or tags between the local memory and a main memory to improve storage capacity of the local memory.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
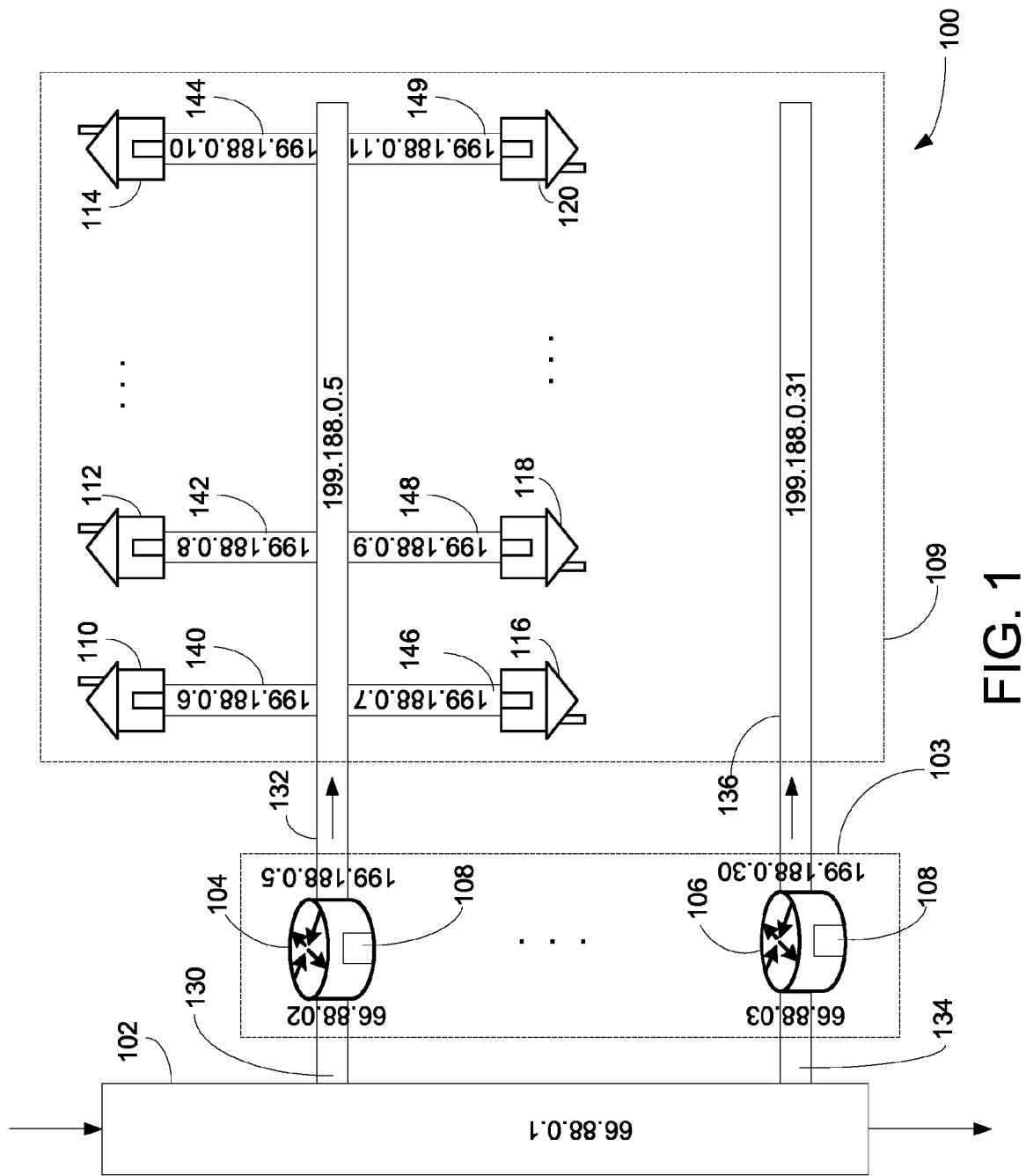
FIG. 1 is a block diagram illustrating a network routing device having a netflow statistics component in accordance with one embodiment of the present invention.

Exemplary embodiment(s) of the present invention is described herein in the context of a method, device, and apparatus of using a direct memory access ("DMA") to facilitate line rate netflow statistics.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skilled in the art having the benefit of this disclosure.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the exemplary embodiment(s) of inventive concepts disclosed herein. Where a method including a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

An apparatus and method for using a direct memory access ("DMA") to facilitate netflow statistics are disclosed. A network device such as a router or a switch, in one embodiment, includes a statistic component, a local memory, and a memory access controller. The statistic component is configured to gather information relating to net usage from packet flows or netflows in response to corresponding index values or tags. While the local memory such as a cache provides the index values assignable to packet flows, the memory access controller such as a DMA transfers at least a portion of the index values or tags between the local memory and a main memory to increase capacity of the local memory.

FIG. 1 is a block diagram 100 illustrating a network routing device having a netflow statistics component in accordance with one embodiment of the present invention. Diagram 100 includes a communications network 102, a set of network routers 103, and down stream hosts 109. Down stream hosts 109, in one example, can be any types of network capable devices, such as optical converters, routers, switches, servers, printers, computers, and/or a combination of routers, servers, and computers. It should be noted that the underlying concept of the exemplary embodiment(s) of the present invention would not change if one or more blocks (circuit or circuitries) were added to or removed from diagram 100.

Network routers 103 include multiple routers, switchers, hubs, and/or packet processing devices 104-106. Each device 104 or 106 includes an on-chip netflow statistic component 108, which, for example, is used to leverage main memory storage capacity to perform line rate usage statistics. A function of a network router is to receive a packet from a source and redirect the received packet to a destination via an achievable and/or efficient path or output port. While a router may use one Internet Protocol ("IP") address at its input ports, it may use a different IP address at its output ports. As shown in FIG. 1, while IP address for input ports of device 104 is 66.88.02, IP address for output ports of device 104 is 199.188.0.5. A router, in one embodiment, is also capable of communicating with other routers. For example, routing device 104 may be configured to communicate with device 106. It should be further noted that routers or devices 104-106 may also be able to convert optical signals to electrical signals and vice versa.

Down stream hosts 109 further include multiple network capable devices 110-120 connected to router 104 via connections 140-149. It should be noted that each host has a unique IP address. For example, the IP address for device 110 is 199.188.0.6, while the IP address for device 112 is 199.188.0.8. Devices 110-120 can be any types of network capable devices, such as servers, computers, switches, routers, printers, fax machines, and the like.

Each router or packet processing device 104 or 106 has multiple input ports and multiple output ports. Packets travel from a source to one or more destinations across one or more networks. A portion of each packet such as the header of a packet indicates where the packet comes from, where it goes, and what type of data it carries. For example, after extracting and reading the header of a packet, the router forwards or redirects received packet(s) to one or more of its output ports based on the information in the header. The header may be organized into several fields, which include fields for destination address, source address, packet type, quality of services ("QoS"), number of hops, length of payload, and the like.

In operation, after reading the header of a packet, the router determines whether to forward or drop the packet based on the content of the header. For example, the packet may be dropped if its parameter(s) matches with previously identified spam parameter(s). If the packet is allowed to go forward, the router subsequently determines which output port(s) should be used to forward the packet. In one embodiment, router 104 is required to convert data from one data format to another data format. For example, a router may receive optical signals over an optical cable, and subsequently, forward electrical signals to one or more destinations over copper cables after a conversion from optical signals to electrical signals. It should be noted that a router may be required to process a received packet before it can be forwarded because the packet transmission media at the receiving end may have different transmission standards from the packet transmission media at the outputting end. For example, optical transmission media may have different noise tolerance and data capacity from the electrical transmission media. As such, packets may be rearranged and/or chopped before they can be forwarded.

To enhance the ability of tracking network usage, statistic component 108 is deployed for tracking every netflow traveling through a routing engine using a netflow tag or netflow index. The terms "netflow tag," "netflow index," "tag", "index", "tag value", and "index value" are meant to be the same and can be used interchangeably. A list of fresh or new netflow tags is maintained by a direct memory access ("DMA") device to ensure that the cache does not go empty. Fresh or new netflow tags or indexes are net flow identification numbers, tags, or indexes that have not been used or assigned to any netflows. It should be noted that the terms "fresh netflow tags" and "new netflow tags" are meant to be the same and can be used interchangeably.

To keep the cache from being empty, a DMA, in one embodiment, is deployed to maintain a list of new netflow tags in the cache or first-in first-out ("FIFO") stack operating at a line rate. Note that the line rate of a network communication is a data rate of a bit stream arrival at a node or an input port. An advantage of employing statistic component 108 with a DMA is that it enables a netflow statistic mechanism capable of gathering net flows at a line rate even if the netflow is transient.

Figure 2:
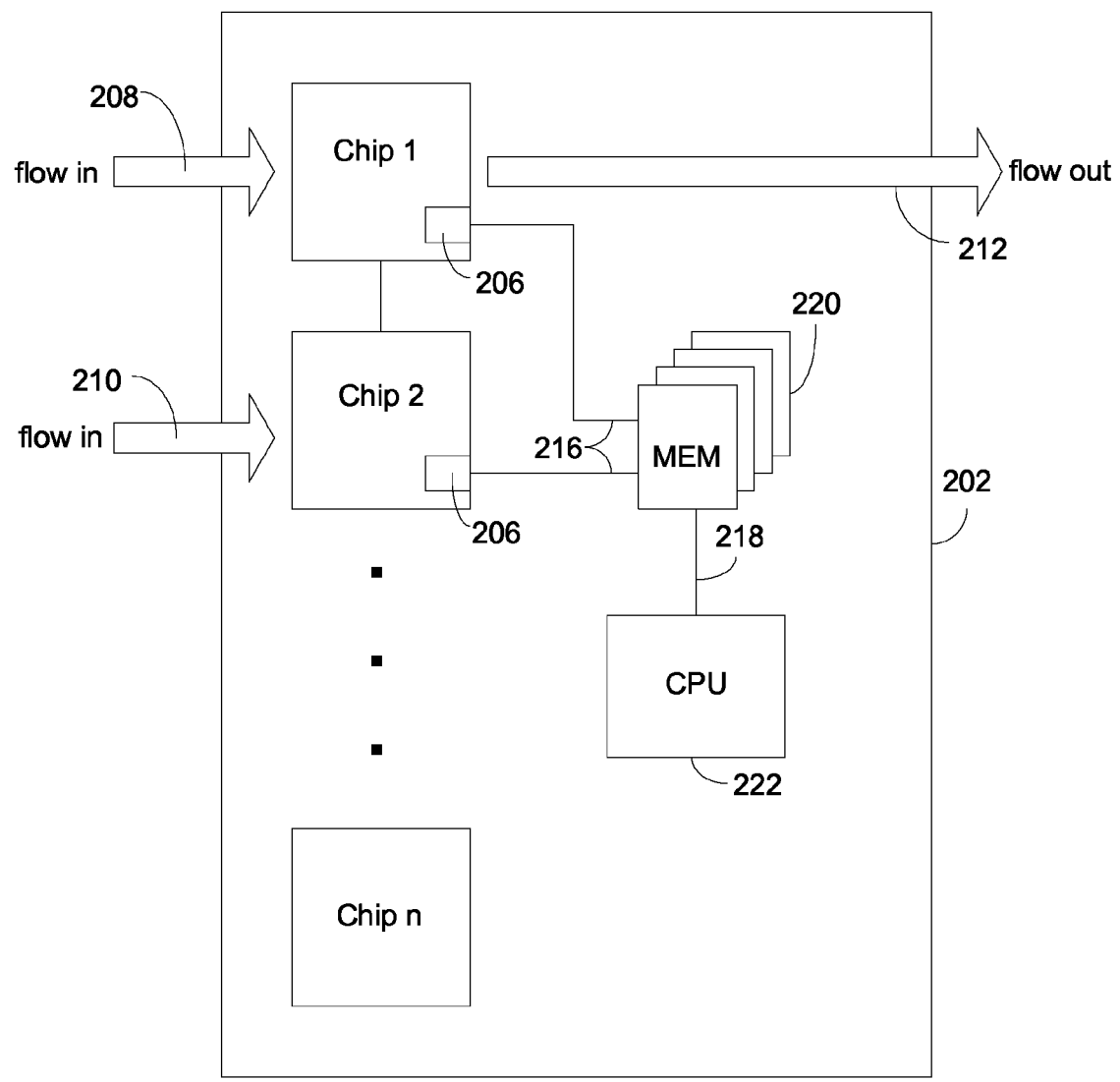
FIG. 2 illustrates a router including multiple routing chips capable of implementing a netflow statistics in accordance with one embodiment of the present invention.
Figure 2:
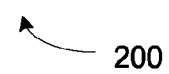

FIG. 2 illustrates a router 200 including multiple routing chips capable of implementing a netflow statistics in accordance with one embodiment of the present invention. Router 200 includes a main memory 220, a central processing unit ("CPU") 222, and a set of routing chips, wherein the set of routing chips, for example, can further include 36 routing chips or engines. Routing chips, main memory 220, and CPU 222 are interconnected via connections 216-218. In one embodiment, router 202 is capable of receiving flows 208-210 via input ports and sending a flow 212 out via an output port. It should be noted that the underlying concept of the exemplary embodiment(s) of the present invention would not change if one or more blocks (circuit or circuitries) were added to or removed from router 200.

Each routing chip such as Chip 1 or Chip 2 includes a statistic mechanism 206, which further contains a DMA, a cache, and an accounting element. The cache, in one embodiment, is a FIFO memory stack capable of storing a list of new netflow tags. The netflow tags are used to track netflows including transient netflows. A transient netflow is a flow that exits for a short period of time. For example, transient flow starts to transmit a few hundred bytes and it ends thereafter. In one embodiment, the accounting element is capable of assigning a netflow tag to a transient flow and tabulating the usage of the network even after the transient flow disappears.

DMA, in one embodiment, constantly loads new netflow indexes or tags from main memory 220 to the cache to ensure that the cache can continuously provide new netflow tags for new netflows. For example, DMA is configured to dynamically transfer new free indexes from main memory 220 to the FIFO at a line rate. In one aspect, the FIFO stack is kept relatively small for conserving chip space while it is maintained as a virtually unlimited FIFO since it is leveraged by main memory 220.

CPU 222, in one embodiment, manages main memory 220 and coordinates on-board routing operations. Main memory 220 can be divided into multiple subsections wherein each subsection is dedicated to one statistic mechanism for a particular routing engine or routing chip. A DMA is associated with each subsection and is capable of direct accessing when there is a need for new tags. For example, if router 202 includes 36 routing engines wherein each engine includes a statistic mechanism 206, main memory 220 may include at least 36 subsections wherein each subsection is used to back up or support a FIFO element on a routing engine. It should be noted that other types of main memory or additional expendably memory can be used to enhance the memory capacity. For instance, mass storage memories such as flash memory and magnetic memory may be used to expend the memory capacity.

Figure 3:
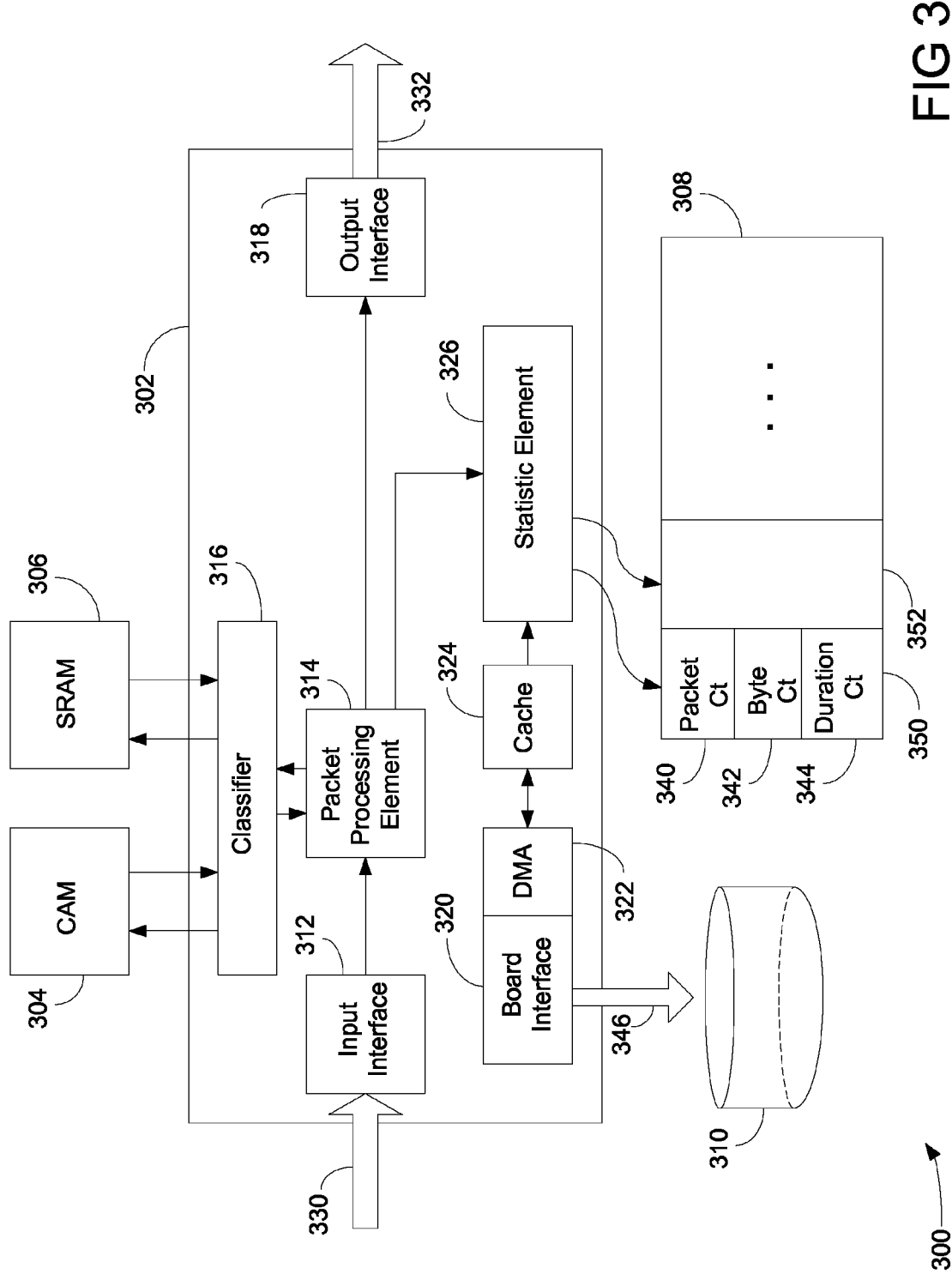
FIG. 3 is a block diagram illustrating an example network router capable of providing netflow statistics in accordance with one embodiment of the present invention.

FIG. 3 is a block diagram 300 illustrating an example network router capable of providing netflow statistics in accordance with one embodiment of the present invention. Diagram 300 includes a routing chip 302, a content addressable memory ("CAM") 304, a result memory 306, a statistic table 308, and a main memory 310. The netflow such as netflow 330 arrives at an input port of routing chip 302, while other netflows such as netflow 332 depart from an output port of routing chip 302. It should be noted that the underlying concept of the exemplary embodiment(s) of the present invention would not change if one or more blocks (circuit or circuitries) were added to or removed from diagram 300.

Routing chip 302 further includes an input interface 312, a classifier 316, a packet processing element 314, an output interface 318, a board interface 320, a DMA 322, a cache 324, and a statistic element 326. Input interface 312 and output interface 318 may include a set of input ports as well as a set of output ports for transferring data. It should be further noted that routing chip 302 may be used in various network interfaces such as an interface between an electrical communications network and a synchronous optical network ("SONET").

A router having multiple routing chips can be a network switch, a network converter, and/or a packet processing device. A function of routing chip 302 is to route a high-speed network data packet to an appropriate destination within a defined line rate. Line rate is a speed of data stream or packets arriving at a location of a network. To process the packets at the line rate, routing chip 302 is required to route packets at the same or substantially same speed as the packets arrive. To route and/or process each packet correctly and efficiently, routing chip 302 is required to perform various packet processing procedures such as packet classification, packet traffic management, packet editing, packet scheduling, packet switching, and the like.

Each packet 330 includes a head portion and a data portion. The head portion, also known as header, refers to additional information located at the beginning of a packet, which includes information relating to how the packet should be forwarded. For example, the header may include source address, destination address, payload type, quality of service ("QoS"), and payload length indicator. The data portion, also known as payload, refers to data block, which may be audio information, video information, data, or a combination of audio, video and data. The length of the payload is indicated by the payload length indicator of the header. Routing chip 302, in one embodiment, is configured to forward the packet in accordance with the information contained in the header.

Packet processing element 314 and classifier 316, in one aspect, categorize a packet or packets according to a set of predefined rules. Traffic management, on the other hand, determines whether the packet should be forwarded or dropped. For example, if a blocking parameter of a firewall matches with the parameter specified in the packet, the packet may be blocked. Packets may also be modified or edited. For example, if the bandwidth of a packet exceeds the bandwidth of an output port, the packet may be modified before it can be transmitted. Packet scheduling identifies when the packet should be sent and packet shaping prevents packets bursting phenomenon. It should be noted that the packet modification, packet scheduling, packet shaping, et cetera, may be obtained based on the packet classification.

Cache 324, also known as a FIFO stack, is a relatively small storage device, which is capable of storing new (or fresh) netflow tags or indexes. For example, FIFO stack may be 32-bit wide and 128 entries deep. Although the storage capacity for cache 324 is limited, it is replenished with new netflow tags on a continuous basis by DMA 322. When the total available new netflow tags fall below a predefined number or threshold, DMA is automatically activated and is capable of fetching new netflow tags from main memory 310 via board interface 320. Deploying a dedicated DMA 322 associated to cache 324 modifies cache's storage capacity, which essentially becomes a source of supplying a virtually unlimited number of netflow indexes. In other words, DMA 322 is configured to keep at least a predefined minimal number of available netflow indexes in cache 324 in accordance with a specified line rate.

DMA 322, in one embodiment, is structured or placed on router chip 302 and is capable of accessing main memory directly via board interface 320. With a predefined line rate, DMA 322, for example, is configured to have sufficient speed to directly access other memories including main memory for keeping FIFO (or cache 324) from being empty. Main memory 310 could be SRAM (static random access memory), DRAM (dynamic random access memory), flash memory, and/or other types of mass storage memories. It should be noted that router chip 302 may employ a secondary cache memory to buffer additional tags or indexes.

Statistic element 326, in one embodiment, includes an assigning component and an accounting component, wherein the assigning component is capable of receiving or detecting a new netflow. After detecting a new netflow, the assigning component fetches or pops a new netflow tag (or index) from FIFO 324 and subsequently assigns the new tag to the new flow. In one embodiment, statistic element 326 is able to determine whether a detected netflow is an existing (or tagged or indexed) flow or a new flow (or netflow). A new netflow can be considered a first time detected flow and no netflow index (es) or tag(s) has been assigned to the flow. An existing flow or tagged flow indicates a netflow that has been detected before and a netflow tag has been assigned to it. Statistic element 326, in one aspect, receives a netflow or the first packet of a netflow from packet processing element 314, as indicated by FIG. 3. Alternatively, a netflow can also be fed to statistic element 326 by input interface 312. In yet another embodiment, statistic element 326 is capable of receiving a netflow from any components situated between input interface 312 and output interface 318.

The accounting component, in one embodiment, maintains and monitors network usage based on netflows between users. The accounting component is capable of counting or tabulating the number of packets, number of bytes, and/or duration of time in accordance with each netflow that flows through routing chip 302. After tabulating, the result associated with a netflow is stored in statistic table 308. Statistic table 308, in one embodiment, is an external memory, which is further divided into multiple sections 350-352. Each section represents a netflow and further includes a packet count 340, a byte count 342, and a duration count 344. While packet count 340 is an accumulated packet number, byte count 342 represents total number of bytes associated with a netflow. Duration count 344 indicates collective net time used by an associated netflow. Statistic table 308 can be shared by other routing chips on the board or in the router. Alternatively, statistic table 308 can be placed on each routing chip or dedicated external memory table to a particular routing chip.

An advantage of using a statistic mechanism using DMA and FIFO is to tabulate any types of netflow including transient netflows. The statistic mechanism using a hardware approach for tracking every netflow enhances the ability to catch the most, if not all, of the netflows that flow through an engine such as routing chip 302. For example, to track a transient netflow, the statistic mechanism is required to use a hardware tabulation to tabulate net usage before it ends since transient netflows only last a short period of time.

In operation, upon detecting a new netflow, statistic element 326 obtains a new netflow tag or index and assigns the new tag to the new flow for tracking net usage. DMA 322 is responsible for maintaining a minimal number of fresh or new netflow indexes in a FIFO. When total numbers of new netflow tags fall below the minimal number or minimal threshold, DAM replenishes new netflow tags from an external memory to the FIFO. Statistic element 326 keeps track of the net usage for a netflow using an assigned netflow tag or index. After the netflow passes through routing chip 302, statistic element 326 updates packet count 340, byte count 342, and/or duration count 344 in statistic table 308 in response to net usage of the netflow.

Figure 4:
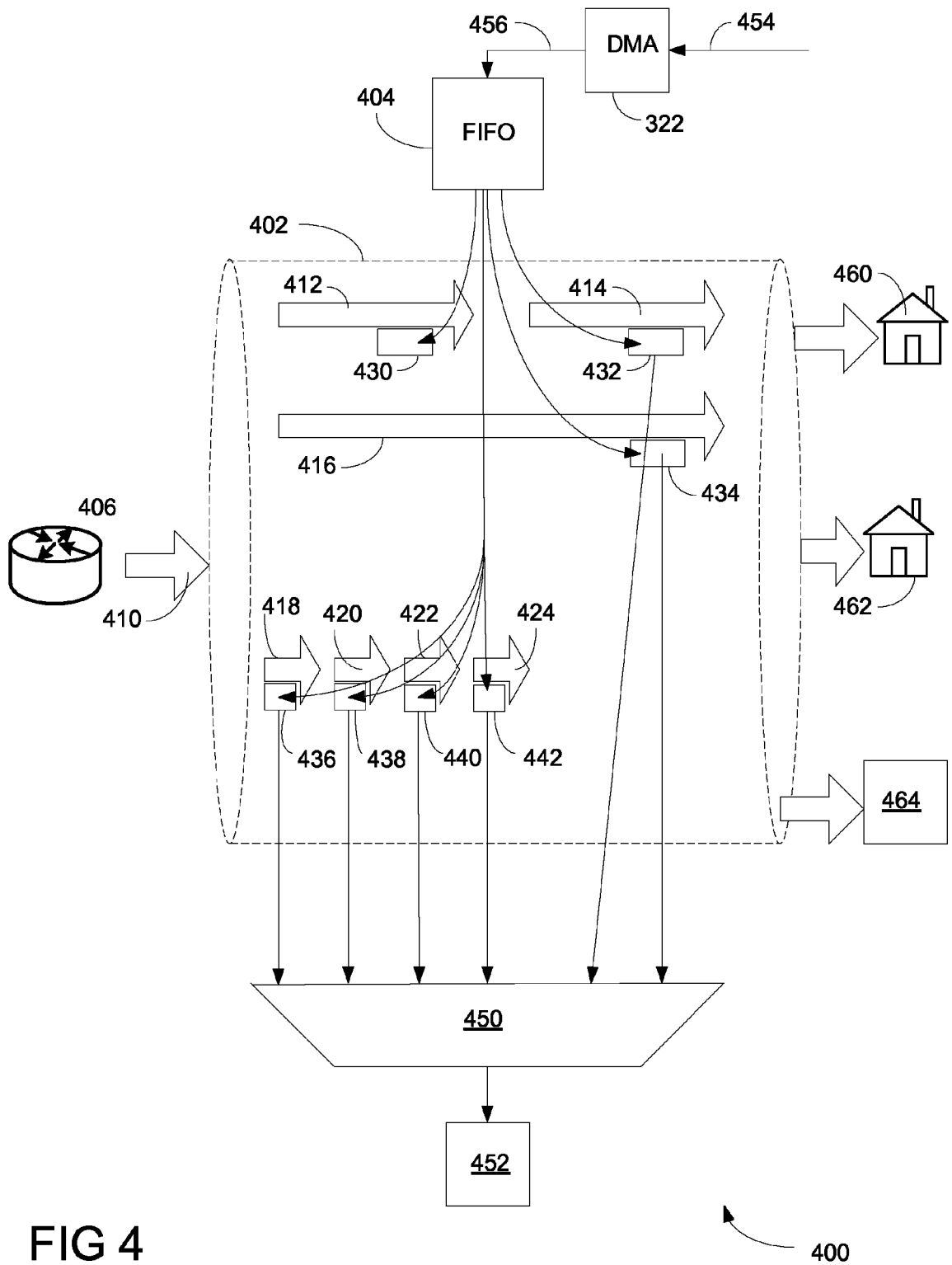
FIG. 4 is a logic block diagram illustrating netflows associated with indexes in accordance with one embodiment of the present invention.

FIG. 4 is a logic block diagram 400 illustrating netflows associated with indexes in accordance with one embodiment of the present invention. Diagram 400 illustrates a source device 406, destination devices 460-464, a routing channel 402, a statistic element 452, and a FIFO 404. FIFO 404 is maintained by a DMA 322 via a connection 456. DMA 322 is capable of directly transferring new netflow tags from main memory, not shown in FIG. 4, to FIFO 404 via connections 454-456. It should be noted that destination devices 460-464 could be residential homes, commercial sectors, and/or other routers or hubs. It should be further noted that the underlying concept of the exemplary embodiment(s) of the present invention would not change if one or more blocks (circuit or circuitries) were added to or removed from diagram 400.

When source device 406 sends netflows 410-424 to one or multiple destination devices 460-464, FIFO 404 is configured to provide netflow tags 430-442 to netflows 410-424, respectively. For example, node 460 is conducting two web searches and netflows 412-414 contain the results of the two web searches. Netflow 416 may contain information relating to voice over IP (Internet Protocol), while netflows 418-424 may indicate four web pages currently active at node 464. Netflow indexes 430-442 keep track of total usage associated with each netflow, and circuit 450 is used to collect tabulated accounting information in light of netflow indexes 430-442. Statistic element 452 receives collected accounting information from circuit 450, and updates the statistic table in accordance with the collected accounting information.

Figure 5:
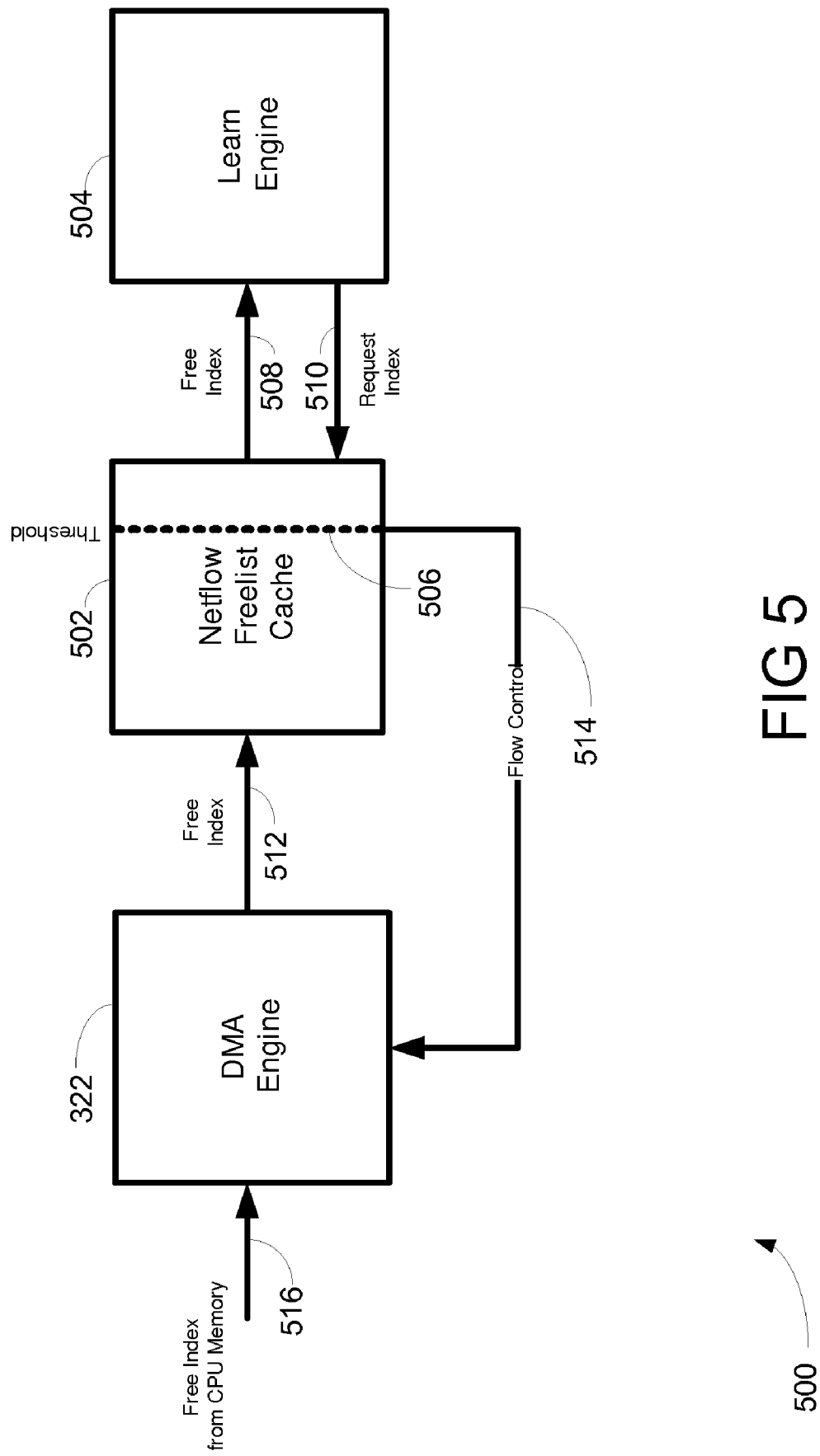
FIG. 5 is a logic flow diagram illustrating a direct memory access ("DMA") capable of facilitating free indexes to an on-chip cache in accordance with one embodiment of the present invention.

FIG. 5 is a logic flow diagram 500 illustrating a direct memory access ("DMA") capable of facilitating free indexes to an on-chip cache in accordance with one embodiment of the present invention. Diagram 500 includes a DMA 322, a cache 502, and a learn engine 504. DMA 322, cache 502, and learn engine 504 are interconnected via connections 508-516, wherein DMA 322 is further coupled to a CPU memory or main memory, not shown in FIG. 5, via connection 516. It should be noted that the underlying concept of the exemplary embodiment(s) of the present invention would not change if one or more blocks (circuit or circuitries) were added to or removed from diagram 500.

Learn engine 504, in one embodiment, is configured to determine whether a netflow is a new flow or an old flow. The old flow indicates that it has already been assigned a tag while a new flow indicates that it is new and no tag has been assigned yet. It should be noted that if it is new, the statistic mechanism needs to assign a tag or index at the line rate thereby the netflow can be tracked and tabulated. For example, when learn engine 504 identifies that the netflow is new, it sends an index request to cache 502 via connection 510, and subsequently, it obtains a free index via connection 508. Cache 502 maintains a netflow free-list, which is a list of fresh netflow indexes or tags. DMA engine 322 is used to supply new netflow indexes to cache 502 when free indexes in cache 502 fall below a threshold or predefined minimal number 506. DMA 322 leverages CPU memory to keep cache from being empty of new tags.

Netflow statistics gathering, in one embodiment, refers to the ability of a network element to gather flow statistics (i.e., byte count, packet count, duration of flow, and the like) for each independent flow within the system. Unique indexes are assigned to independent flows in order to maintain independent statistics for each flow. In order to perform a line rate statistics, the system is able to detect a new flow (i.e. 'learn') and assign a unique index to it in real-time. In a high-speed system, performing statistics at a line rate is possible by maintaining an on-chip memory or FIFO containing free indexes. Note that on-chip FIFO has limited number of available indexes, and hence the number of flows for which unique indexes may be assigned The statistic mechanism has an on-chip FIFO (or cache) of free indexes. When new flows are learned, indexes are popped off from the FIFO, which is assigned as needed. An active DMA keeps the FIFO stocked with free indexes and ensures that FIFO does not go empty. The capacity of FIFO and its thresholds, for example, may be determined by the line rate. Also, the configuration of FIFO can also be influenced by latency generated by DMA engine. DMA or DMA engine is capable of constantly fetching free entries from the CPU main memory (maintained by software) and populating the free entries to the FIFO (or the cache).

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components. While embodiments of the present invention will be described with reference to the communications network, the method and apparatus described herein are equally applicable to other network infrastructures or other data communications environments.

Figure 6:
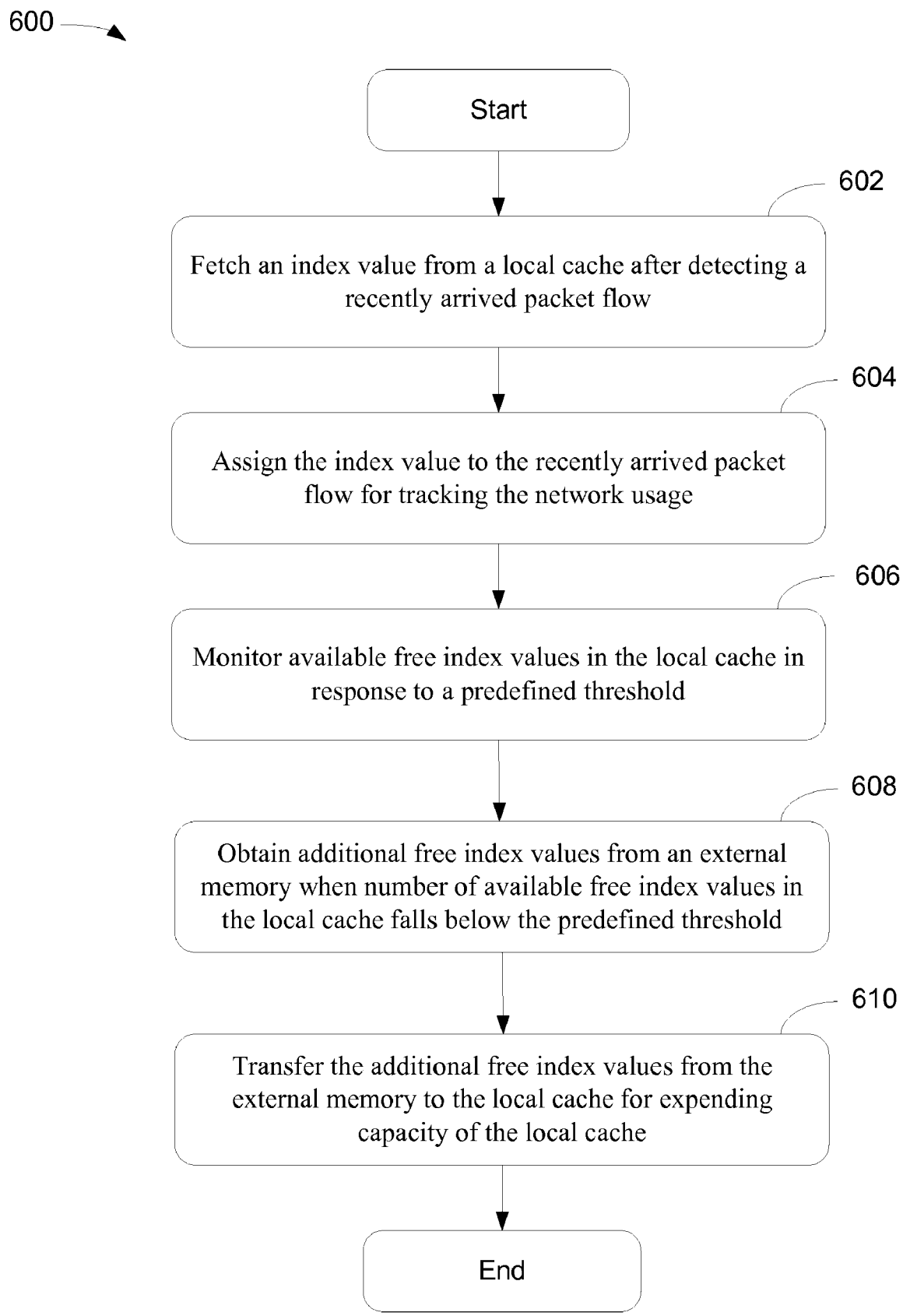
FIG. 6 is a flowchart illustrating a process of providing netflow statistics implementing at a line rate in accordance with one embodiment of the present invention.

FIG. 6 is a flowchart 600 illustrating a process of providing netflow statistics implementing at a line rate in accordance with one embodiment of the present invention. At block 602, a statistic tabulating process fetches an index value or tag from a local cache after detecting a recently arrived netflow. In one embodiment, the process is capable of forwarding the index value to a learn engine, wherein the index or netflow index or netflow tag is popped off from an on-chip FIFO stack.

At block 604, the process assigns the index value to the recently arrived netflow for tracking network usage of the recently arrived netflow based on the index value. In one aspect, the process is capable of determining the recently arrived netflow as a new flow in response to a source Internet Protocol ("IP") address, a destination IP address, a source port, and a destination port.

At block 606, the process monitors available free index values in the local cache in response to a predefined threshold. The process is configured to allow a DMA engine to maintain, adjust, and expend FIFO storage capacity or cache capacity.

At block 608, the process obtains additional free index values from an external memory when the number of available free index values in the local cache falls below the predefined threshold. For example, while monitoring index values associated with netflows, the process fetches free index values in a main memory and subsequently stores the free index values in the local cache.

At block 610, the process is capable of transferring the additional free index values from the external memory to the local cache for expending capacity of the local cache. In one example, the process records network usage in response to byte count, packet count, duration count, or a combination of byte count, packet count and duration count.

While particular embodiments of the present invention have been shown and described, it will be obvious to those skilled in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A device comprising:
a statistic component configured to gather information relating to net usage for a plurality of packet flows in response to a plurality of corresponding index values;
a local memory coupled to the statistic component and configured to provide the index values assignable to the plurality of packet flows; and
a memory access controller coupled to the local memory and configured to transfer a portion of the plurality of corresponding index values between the local memory and a main memory to enhance capacity of the local memory at a predefined threshold.

2. The device of claim 1, further comprising a packet processing component coupled to the local memory and configured to obtain a free index value from the local memory and assigning the free index value to a newly arrived packet flow.

3. The device of claim 1, further comprising a learn engine coupled to the local memory and configured to obtain a free index value from the local memory and assigning the free index value to a recently arrived data flow.

4. The device of claim 3,
wherein the network device is a router; and
wherein the statistic component is a part of learn engine.

5. The device of claim 1,
wherein the information relating to net usage includes statistic values, wherein the statistic values include one of byte count, packet count, duration count, and a combination of byte count, packet count, and duration count; and
wherein each of the plurality of packet flows includes a data stream organized in packets.

6. The device of claim 1, wherein the local memory is an on-chip cache memory having a storage memory capacity of 32-bit wide and 128-bit deep.

7. The device of claim 1, wherein the local memory is constructed in a first-in-first-out ("FIFO") memory configuration, wherein index values stored in the FIFO shift through the FIFO.

8. The device of claim 1, wherein the memory access controller is a direct memory access ("DMA") configured to facilitate memory accessing between the local memory and the main memory.

9. The device of claim 1,
wherein the main memory is an external memory;
wherein the predefined threshold indicates a minimal number of available free index values; and
wherein the local memory operates at a line rate speed.

10. A method of gathering network usage, comprising:
fetching an index value from a local cache after detecting a recently arrived netflow;
assigning the index value to the recently arrived netflow for tracking the network usage of the recently arrived netflow based on the index value;
monitoring available free index values in the local cache in response to a predefined threshold;
obtaining additional free index values from an external memory when number of available free index values in the local cache falls below the predefined threshold; and
transferring the additional free index values from the external memory to the local cache for expanding capacity of the local cache.

11. The method of claim 10, further comprising recording network usage in response to one of byte count, packet count, duration count, and a combination of byte count, packet count and duration count.

12. The method of claim 11, wherein fetching an index value from a local cache after detecting a recently arrived netflow further includes forwarding the index value to a learn engine.

13. The method of claim 10, wherein assigning the index value to the recently arrived netflow for tracking the network usage further includes determining the recently arrived netflow as a new flow in response to a source Internet Protocol ("IP") address, a destination IP address, a source port, and a destination port.

14. The method of claim 10, wherein monitoring available free index values in the local cache in response to a predefined threshold further includes allowing a direct memory access ("DMA") device to adjust and to expand storage capacity of the local cache.

15. The method of claim 10, wherein obtaining additional free index values from an external memory further includes:
monitoring index values associated with netflows;
fetching a plurality of free index values in a main memory; and
storing the plurality of free index values in the local cache.

16. An apparatus for gathering network usage, comprising:
means for fetching an index value from a local cache after detecting a recently arrived netflow;
means for assigning the index value to the recently arrived netflow for tracking the network usage of the recently arrived netflow based on the index value;
means for monitoring available free index values in the local cache in response to a predefined threshold;
means for obtaining additional free index values from an external memory when number of available free index values in the local cache falls below the predefined threshold; and
means for transferring the additional free index values from the external memory to the local cache for expanding capacity of the local cache.

17. The apparatus of claim 16, further comprising means for recording network usage in response to one of byte count, packet count, duration count, and a combination of byte count, packet count and duration count.

18. The apparatus of claim 17, wherein means for fetching an index value from a local cache after detecting a recently arrived netflow further includes means for forwarding the index value to a learning engine.

19. The apparatus of claim 16, wherein means for assigning the index value to the recently arrived netflow for tracking the network usage further includes means for determining the recently arrived netflow as a new flow in response to a source Internet Protocol ("IP") address, a destination IP address, a source port, and a destination port.

20. The apparatus of claim 16, wherein means for monitoring available free index values in the local cache in response to a predefined threshold further includes means for allowing a direct memory access ("DMA") device to adjust and to expand storage capacity of the local cache.

* * * * *